US011931885B2

(12) United States Patent
Chau et al.

(10) Patent No.: US 11,931,885 B2
(45) Date of Patent: Mar. 19, 2024

(54) TOUCH SENSING METHOD AND SERIAL MANIPULATOR USING THE SAME

(71) Applicants: UBTECH NORTH AMERICA RESEARCH AND DEVELOPMENT CENTER CORP, Pasadena, CA (US); UBTECH ROBOTICS CORP LTD, Shenzhen (CN)

(72) Inventors: Sheryl Suet Ying Chau, Rancho Cucamonga, CA (US); Yang Shen, Los Angeles, CA (US); Chengkun Zhang, Temple City, CA (US); Huan Tan, Pasadena, CA (US)

(73) Assignee: UBKANG (QINGDAO) TECHNOLOGY CO., LTD., Qingdao (CN)

( * ) Notice: Subject to any disclaimer, the term of this patent is extended or adjusted under 35 U.S.C. 154(b) by 315 days.

(21) Appl. No.: 17/513,917

(22) Filed: Oct. 29, 2021

(65) Prior Publication Data
US 2023/0133207 A1    May 4, 2023

(51) Int. Cl.
*B25J 13/08*  (2006.01)
*B25J 9/16*  (2006.01)
*G01L 5/169*  (2020.01)

(52) U.S. Cl.
CPC ........... *B25J 13/085* (2013.01); *B25J 13/081* (2013.01); *G01L 5/169* (2020.01)

(58) Field of Classification Search
CPC ...... B25J 13/085; B25J 13/081; B25J 9/1676; G01L 5/169; G05B 2219/40201; G05B 2219/40202
See application file for complete search history.

(56) References Cited

U.S. PATENT DOCUMENTS

| | | | |
|---|---|---|---|
| 2022/0233271 A1* | 7/2022 | Peine | A61B 90/06 |
| 2023/0008146 A1* | 1/2023 | Spenninger | B25J 13/08 |

FOREIGN PATENT DOCUMENTS

WO    WO-2022207782 A1 * 10/2022

OTHER PUBLICATIONS

Popov, Collision Detection, Localization & Classification for Industrial Robots with Joint Torque Sensors, Sep. 1, 2017, 26th IEEE International Symposium on Robot and Human Interactive Communication (RO-MAN) (Year: 2017).*
Bimbo, Collision Detection and Isolation on a Robot using Joint Torque Sensing, Nov. 4-8, 2019, IEEE/RSJ International Conference on Intelligent Robots and Systems (IROS) (Year: 2019).*

* cited by examiner

*Primary Examiner* — Adam R Mott
*Assistant Examiner* — Heather J Keniry

(57) ABSTRACT

A touch sensing method and a serial manipulator using the same are disclosed. A serial manipulator using the method may detect and localize external torques by obtaining a torque value of each joint of a serial manipulator through a torque sensor at the joint; obtaining a preset joint angle of each joint from the serial manipulator; calculating a Jacobian matrices of the serial manipulator based on the joint angle of the joints; estimating joint torques of the serial manipulator based on the torque value of each joint and the Jacobian matrices; calculating an error between the torque value of each joint and the estimated joint torque corresponding to the joint; and determining a link of the serial manipulator that is connected to the joint with the minimum calculated error as having been touched.

20 Claims, 9 Drawing Sheets

TOUCH SENSING METHOD AND SERIAL MANIPULATOR USING THE SAME

BACKGROUND

1. Technical Field

The present disclosure relates to robotics, and particularly to a touch sensing method and a serial manipulator using the same.

2. Description of Related Art

In addition to industrial applications such as pick-and-place assembly, serial manipulators (also known as serial robots) already have some other uses in, for example, experiment, housework and medical treatment that are human-related in more extent. When used for interacting with human, the safety is crucial because collisions may be caused to pose danger to human and the surroundings with their high degrees of freedom manipulability.

At present, the collision detection and collision avoidance for serial manipulators are not well developed because they are mostly used in industrial applications rather than domestic (e.g., housework) applications. Therefore, tactile sensors such as electronic skin may be used by attaching to a serial manipulator to detect collision and touch from human. However, these sensors are expensive and need maintenance and replacement over time as they get directly in contact with collision objects during collision events. Moreover, it is also not feasible to obtain high spatial resolution in detection collision if the number of tactile sensors is limited.

Alternatively, torque sensors may be used by installing on the manipulator to provide the approximate location and magnitude of the collision or the touch. However, it could be seen from testing that it is not possible to locate the touch point merely from raw data output from the torque sensors.

BRIEF DESCRIPTION OF TIE DRAWINGS

In the drawing(s), the same element will be designated using the same or similar reference numerals throughout the figures. It should be understood that, the drawings in the following description are only examples of the present disclosure. For those skilled in the art, other drawings can be obtained based on these drawings without creative works.

DETAILED DESCRIPTION

Figure 1:
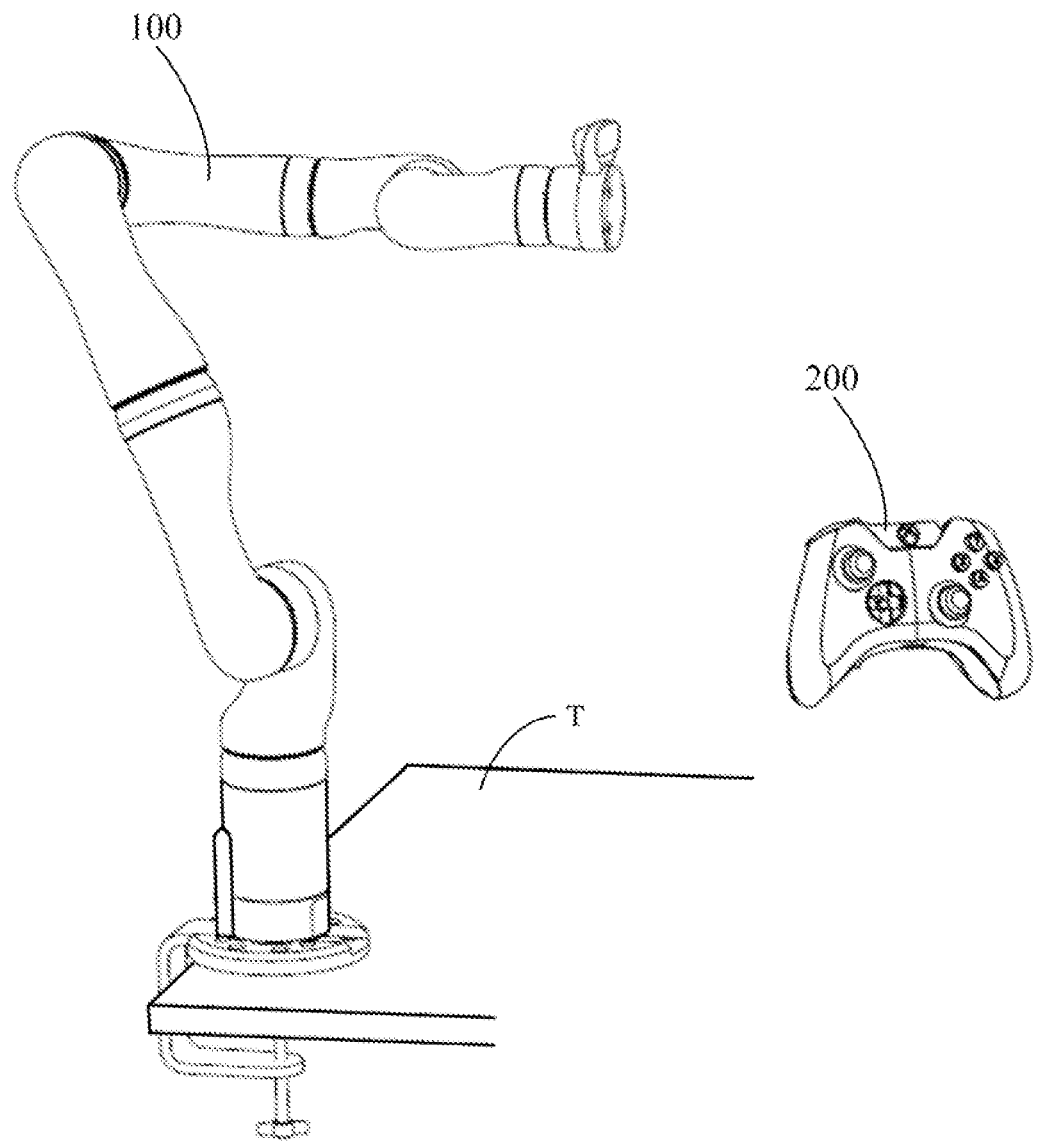
FIG. 1 is a schematic diagram of a usage scenario of a serial manipulator according to some embodiments of the present disclosure.

In order to facilitate the understanding of the objects, features and advantages of the present disclosure, the technical solutions in this embodiment will be clearly and completely described below with reference to the drawings. All other embodiments obtained by those skilled in the art based on the embodiments of the present disclosure without creative efforts are within the scope of the present disclosure.

It is to be understood that, when used in the description and the appended claims of the present disclosure, the terms "including", "comprising", "having" and their variations indicate the presence of stated features, integers, steps, operations, elements and/or components, but do not preclude the presence or addition of one or a plurality of other features, integers, steps, operations, elements, components and/or combinations thereof.

It is also to be understood that, the terminology used in the description of the present disclosure is only for the purpose of describing particular embodiments and is not intended to limit the present disclosure. As used in the description and the appended claims of the present disclosure, the singular forms "one", "a", and "the" are intended to include the plural forms as well, unless the context clearly indicates otherwise.

It is also to be further understood that the term "and/or" used in the description and the appended claims of the present disclosure refers to any combination of one or more of the associated listed items and all possible combinations, and includes such combinations.

In the present disclosure, the terms "first", "second", and "third" are for descriptive purposes only, and are not to be comprehended as indicating or implying the relative importance or implicitly indicating the amount of technical features indicated. Thus, the feature limited by "first", "second", and "third" may include at least one of the feature either explicitly or implicitly. In the description of the present disclosure, the meaning of "a plurality" is at least two, for example, two, three, and the like, unless specifically defined otherwise.

In the present disclosure, the descriptions of "one embodiment", "some embodiments" or the like described in the specification mean that one or more embodiments of the present disclosure can include particular features, structures, or characteristics which are related to the descriptions of the descripted embodiments. Therefore, the sentences "in one embodiment", "in some embodiments", "in other embodiments", "in other embodiments" and the like that appear in different places of the specification do not mean that descripted embodiments should be referred by all other embodiments, but instead be referred by "one or more but not all other embodiments" unless otherwise specifically emphasized.

The present disclosure relates to the touch sensing for a serial manipulator. As used herein, the term "serial manipulator" refers to a robot designed as a series of links connected by motor-actuated joints that extend from a base to an end-effector, which usually has an anthropomorphic arm structure described as having a "shoulder", an "elbow", and a "wrist". The term "touch sensing" refers to detecting and approximating the location of the physical contact. The term "sensor" refers to a device, module, machine, or subsystem such as touch sensor, ambient light sensor and image sensor (e.g., camera) whose purpose is to detect events or changes in its environment and send the information to other electronics (e.g., processor).

FIG. 1 is a schematic diagram of a usage scenario of a serial manipulator 100 according to some embodiments of the present disclosure. In a scenario (e.g., a scientific experiment and a surgical operation) of using the serial manipulator 100 which may be fixed on an object such as a table T, touch sensing may be realized on the serial manipulator 100 to detect and localize external touches from other objects (e.g., humans, animal, furniture, and walls) so as to, for example, interact with the related objects, correct its motions, or realize its collision avoidance.

In some embodiments, the touch sensing of the serial manipulator 100 may be configured and/or actuated through the serial manipulator 100 itself (e.g., a control interface on the serial manipulator 100) or a control device 200 such as a remote control, a smart phone, a tablet computer, a notebook computer, a desktop computer, or other electronic device by, for example, providing a request for the touch sensing of the serial manipulator 100. The serial manipulator 100 and the control device 200 may communicate over a network which may include, for example, the Internet, intranet, extranet, local area network (LAN), wide area network (WAN), wired network, wireless networks (e.g., Wi-Fi network. Bluetooth network, and mobile network), or other suitable networks, or any combination of two or more such networks.

Figure 2:
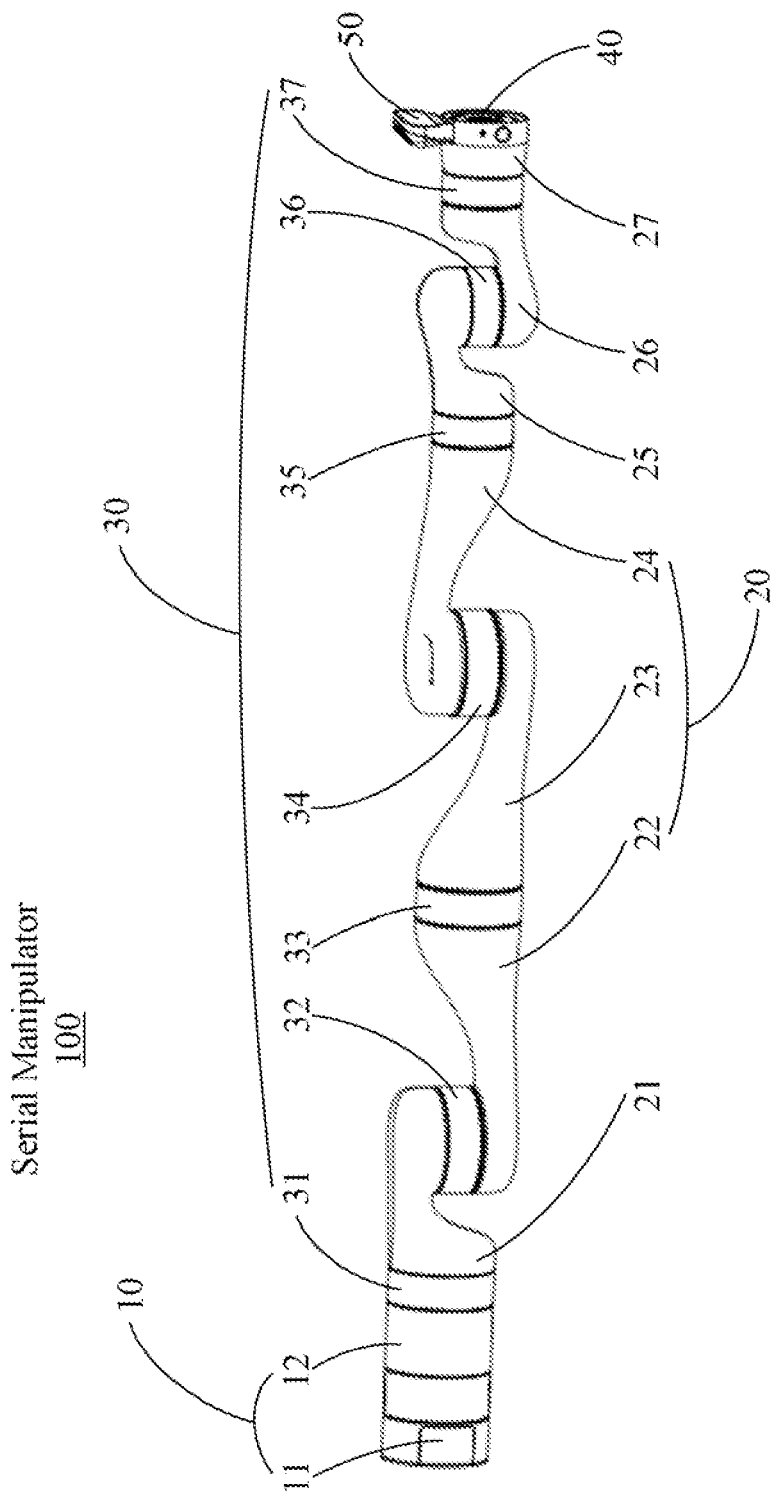
FIG. 2 is a perspective view of the serial manipulator according to the embodiment of FIG. 1.

FIG. 2 is a perspective view of the serial manipulator 100 according to the embodiment of FIG. 1. In some embodiments, the serial manipulator 100 may include a base 10, a series of links 20, joints 30, a vision module 40, and an end-effector interface 50 for connecting an end-effector. The serial manipulator 100 may be Kinova Gen3 or other type of serial manipulator, and the length of the links may be variable. The series of links 20 are connected by the joints 30 to extend from the base 10 to the end-effector connected to the end-effector interface 50, where each joint 30 has one corresponding link 20 that moves with the motion of the joint 30 (e.g., the link 20 between the joint 31 and the joint 32 moves with the motion of the joint 31).

The base 10 includes a controller 11 and a base shell 12, which may be taken as a base link. The links 20 include seven links namely an upper arm top half 22 (i.e., the second link), an upper arm lower half 23 (i.e., the third link), a lower arm 24 (i.e., the fourth link), and other links including the link 21 between the joint 31 and the joint 32 (i.e., the first link which is connected to the base 10 via the joint 31), the link 25 between the joint 35 and the joint 36 (i.e., the fifth link), the link 26 between the joint 36 and the joint 37 (i.e., the sixth link), and the link 27 between the joint 37 and the end-effector interface 50 (i.e., the seventh link). The joints 30 includes joints 31-37, where the joints 31-33 form the shoulder of the serial manipulator 100, the joint 34 is the elbow of the serial manipulator 100, and the joints 35-37 form the wrist of the serial manipulator 100.

In the view of degrees of freedom (DoF), there are two kinds of manipulators namely non-redundant manipulators and redundant manipulators. A redundant manipulator has more than six degrees of freedom which means that it has additional joint parameters that allow the configuration of the manipulator to change while it holds its end-effector in a fixed position and orientation. A typical redundant manipulator has seven joints, for example three at the shoulder, one elbow joint and three at the wrist, which can move its elbow around a circle while it maintains a specific position and orientation of its end-effector. The serial manipulator 100 is a redundant manipulator because it has seven joints 30 to realize seven degrees of freedom.

Each of the joints 30 (i.e., the joints 31-37) has a motor M (see FIG. 3) and a torque sensor S (see FIG. 3), and the movement of (the links 20 of) the serial manipulator 100 is realize by rotating the joints 30 through the motors M to drive the corresponding links 20 to move. The torque sensor S may be installed at the joint 30 by, for example, mounting on an output shaft of the motor M of the joint 30. The controller 11 is for control the serial manipulator 100 by, for example, actuating the motors M to rotate the corresponding the joints 30 so as to drive the corresponding links 20. The vision module 40 is installed on a side of the end-effector interface 50 to realize the visual function of the serial manipulator 100, for example, detecting the object to be operated (e.g., grabbed or assembled) by the end-effector connected to the end-effector interface 50. It should be noted that, the serial manipulator 100 is only one example of serial manipulator, and the serial manipulator 100 may have more or fewer parts than shown in above or below (e.g., have a sonar module rather than the vision module 40), or may have a different configuration or arrangement of the parts (e.g., have a host computer separated from the serial manipulator 100 rather than the controller 11 in the base 10).

Figure 3:
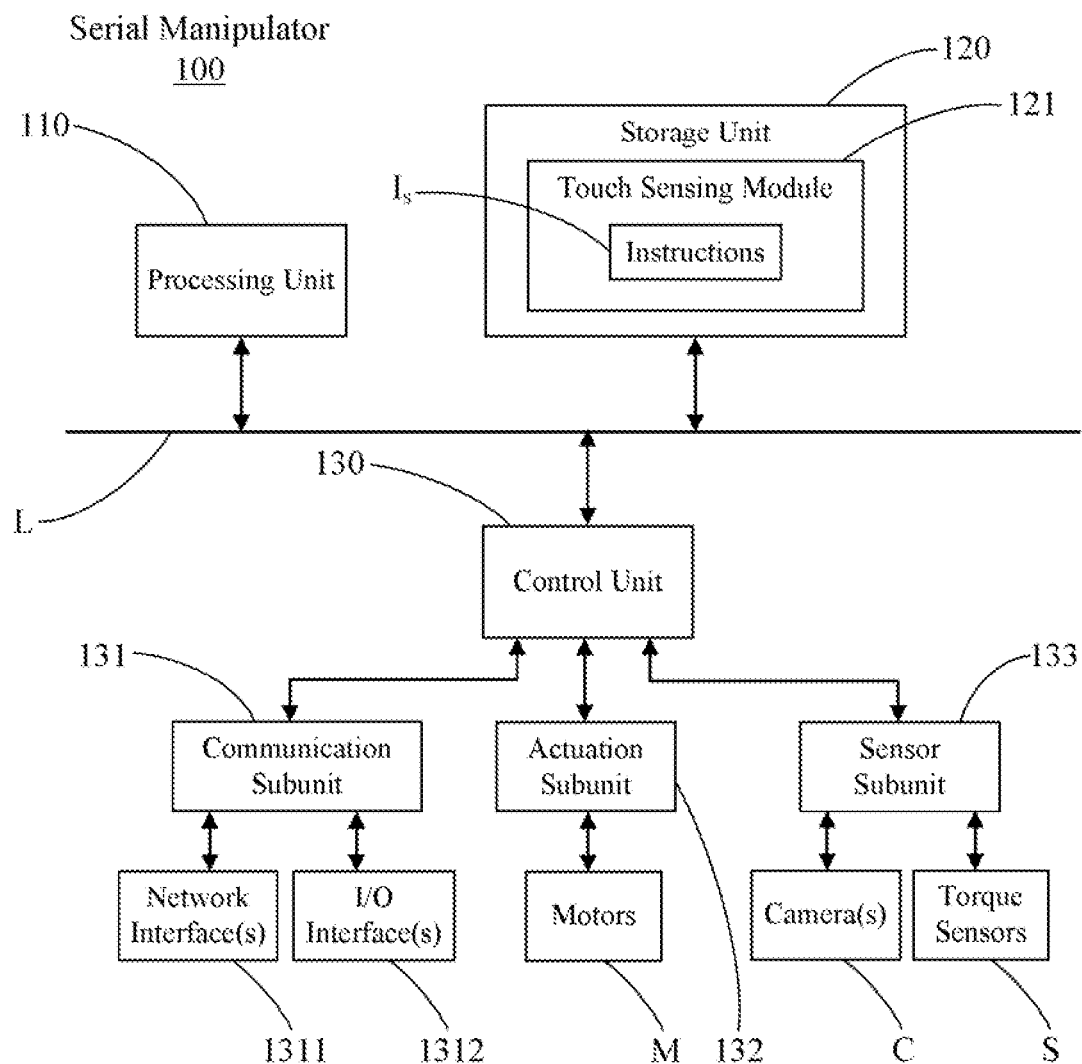
FIG. 3 is a schematic block diagram illustrating the serial manipulator of FIG. 2.

FIG. 3 is a schematic block diagram illustrating the serial manipulator 100 of FIG. 2. The serial manipulator 100 may include a processing unit 110, a storage unit 120, and a control unit 130 that communicate over one or more communication buses or signal lines L. It should be noted that, the serial manipulator 100 is only one example of serial manipulator, and the serial manipulator 100 may have more or fewer components (e.g., unit, subunits, and modules) than shown in above or below, may combine two or more components, or may have a different configuration or arrangement of the components. The processing unit 110 executes various (sets of) instructions stored in the storage unit 120 that may be in form of software programs to perform various functions for the serial manipulator 100 and to process related data, which may include one or more processors (e.g., CPU). The storage unit 120 may include one or more memories (e.g., high-speed random access memory (RAM) and non-transitory memory), one or more memory controllers, and one or more non-transitory computer readable storage media (e.g., solid-state drive (SSD) or hard disk drive). The control unit 130 may include various controllers (e.g., camera controller, display controller, and physical button controller) and peripherals interface for coupling the input and output peripheral of the serial manipulator 100, for example, external port (e.g., USB), wireless communication circuit (e.g., RF communication circuit), audio circuit (e.g., speaker circuit), sensor (e.g., torque sensor), and the like, to the processing unit 110 and the storage unit 120.

In some embodiments, the storage unit 120 may include a touch sensing module 121 for implementing the touch sensing function (e.g., touch detection and touch localization) of the serial manipulator 100. The touch sensing module 121 may be stored in the one or more memories (and the one or more non-transitory computer readable storage media), which may be a software module (of the operation system of the controller 11 the serial manipulator 100) that has instructions $I_s$ for implementing the touch sensing of the serial manipulator 100.

The control unit 130 may include a communication subunit 131 and an actuation subunit 132. The communication subunit 131 and the actuation subunit 132 communicate with the control unit 130 over one or more communication buses or signal lines that may be the same or at least partially different from the above-mentioned one or more communication buses or signal lines L. The communication subunit 131 is coupled to communication interfaces of the serial manipulator 100, for example, network interface(s) 1311 for the serial manipulator 100 to communicate with the control device 200 via the network, I/O interface(s) 1312 (e.g., a physical button), and the like. The actuation subunit 132 is coupled to component(s)/device(s) for implementing the motions of the serial manipulator 100 by, for example, actuating the motors M of the joints 30. The communication subunit 131 may include controllers for the above-mentioned communication interfaces of the serial manipulator 100, and the actuation subunit 132 may include controller(s) for the above-mentioned component(s)/device(s) for implementing the motions of the serial manipulator 100. The serial manipulator 100 may further include a sensor subunit 133 which may include a set of sensor(s) (and related controller(s)), for example, camera(s) C of the vision module 50 and the torque sensors S, for detecting the environment in which it is located. The sensor subunit 133 communicates with the control unit 130 over one or more communication buses or signal lines that may be the same or at least partially different from the above-mentioned one or more communication buses or signal lines L.

In some embodiments, the various components shown in FIG. 3 may be implemented in hardware, software or a combination of both hardware and software. Two or more of the processing unit 110, the storage unit 120, the control unit 130, and other units/subunits/modules may be implemented on a single chip or a circuit. In other embodiments, at least a part of them may be implemented on separate chips or circuits. In addition, the communication subunit 131, actuation subunit 132, and/or the sensor subunit 133 may just abstract component for representing the logical relationships between the components of the serial manipulator 100.

Figure 4:
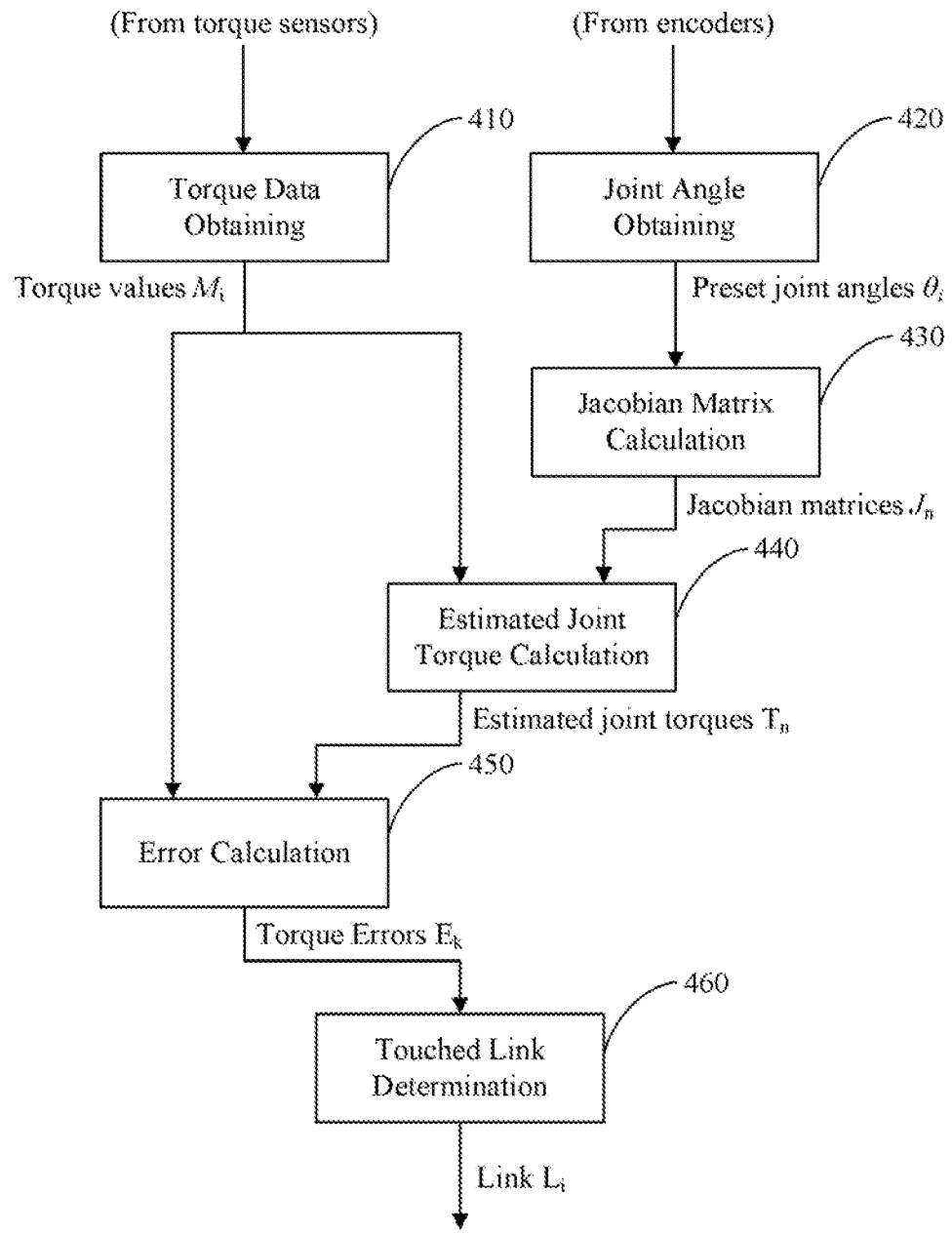
FIG. 4 is a schematic block diagram of touch sensing according to some embodiments of the present disclosure.

FIG. 4 is a schematic block diagram of touch sensing according to some embodiments of the present disclosure. In some embodiments, a touch sensing method may be implemented in the serial manipulator 100 to detect and localize external touches upon the serial manipulator 10 through, for example, storing (sets of) the instructions $I_s$ corresponding to the touch sensing method as the touch sensing module 121 in the storage unit 120 and executing the stored instructions $I_s$ through the processing unit 110, and then external touches upon the serial manipulator 100 can be detected. The touch sensing method may be performed in response to, for example, a request for touch sensing from (the operation system of the controller 10 of) the serial manipulator 100 itself or the control device 200. In other embodiments, the touch sensing method may be implemented in other serial manipulator with modification in the corresponding Denavit-Hartenberg (DH) parameters and tuning parameters.

According to the touch sensing method, the processing unit 110 may obtain a torque value $M_i$ of each of the joints 30 through the torque sensor S at the joint 30 (block 410). In which, the torque value $M_i$ is the torque of the i-th joint 30 that is obtained through the corresponding torque sensor S, and i is between 1 and the total number (i.e., 7) of the joints 30. For example, the torque value $M_1$ is the torque of the joint 31, and the torque value $M_7$ is the torque of the joint 37.

Figure 5:
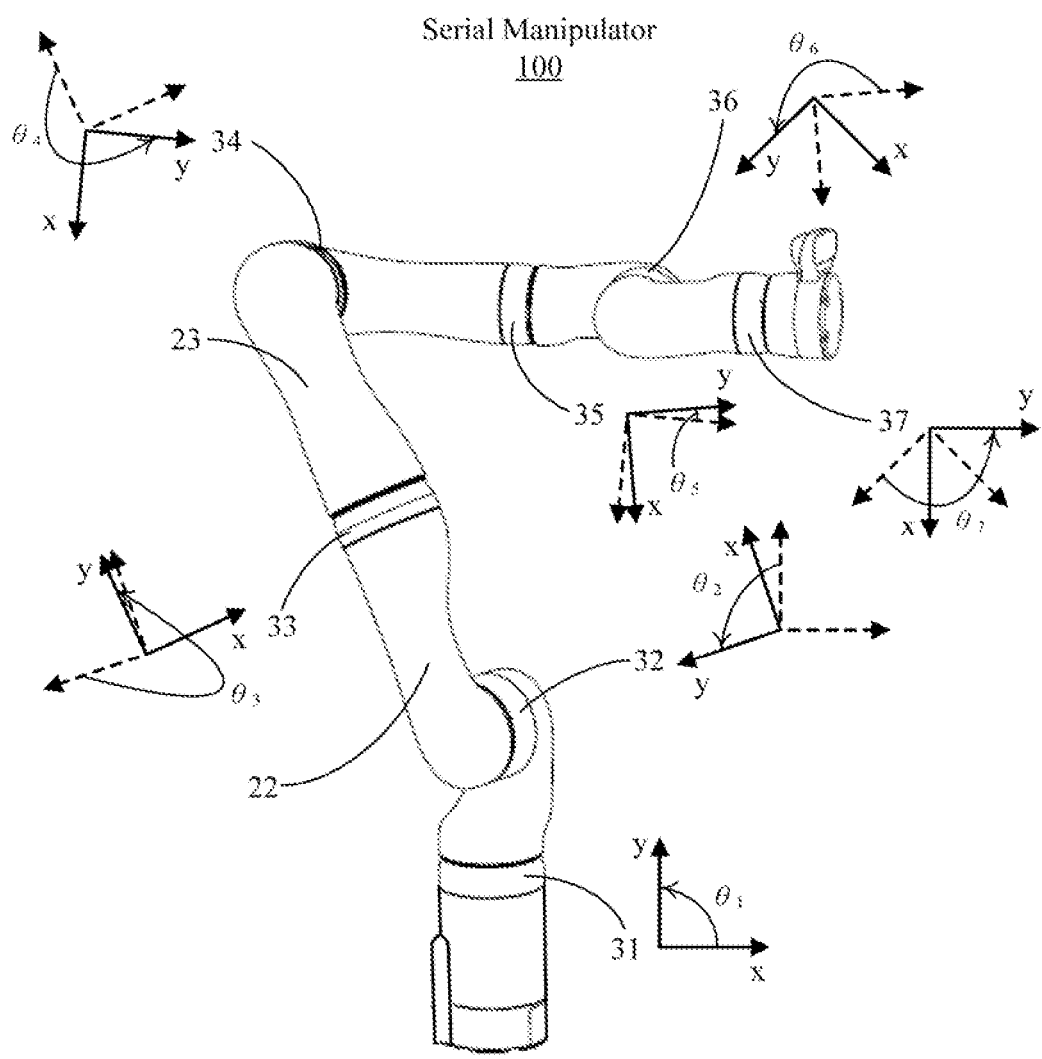
FIG. 5 is a schematic diagram of joint angles of the joints of the serial manipulator of FIG. 2.

In the touch sensing method, the processing unit 110 may further obtain a preset joint angle $\theta_i$ of each of the joints 30 from the serial manipulator 100 (block 420 of FIG. 4). The joint angle $\theta_i$ may be the joint angle of the current configuration of the serial manipulator 100 that is obtained from an encoder of the serial manipulator 100. The encoder may be a rotary position encoder located at the motor M of the joint 30. FIG. 5 is a schematic diagram of the joint angles of the joints 30 of the serial manipulator 100 of FIG. 2. A joint angle is the relative angle between two links connected to a joint. As shown in FIG. 5, the joint angles of the joints 30 include joint angles $\theta_1$-$\theta_7$, where the joint angle $\theta_i$ is the angle of the i-th joint 30, and i is between 1 and the total number (i.e., 7) of the joints 30. For example, the joint angle $\theta_3$ is the angle of the joint 33, that is, the angle between the two links 22 and 23 connected to the joint 33.

In the touch sensing method, the processing unit 110 may further calculate a plurality of Jacobian matrices of the serial manipulator 100 based on the obtained joint angle of the joints 30 (block 430 of FIG. 4). In some embodiments, in order to make the calculated Jacobian matrix suitable for numerical evaluation and digital implementations, the serial manipulator 100 may be discretized into a plurality of segments (e.g., segments with 0.1 cm length). Jacobian matrix $J_n$ is the n-th Jacobian matrix of the serial manipulator 100, where n is between 1 and the total number of the segments.

Figure 6:
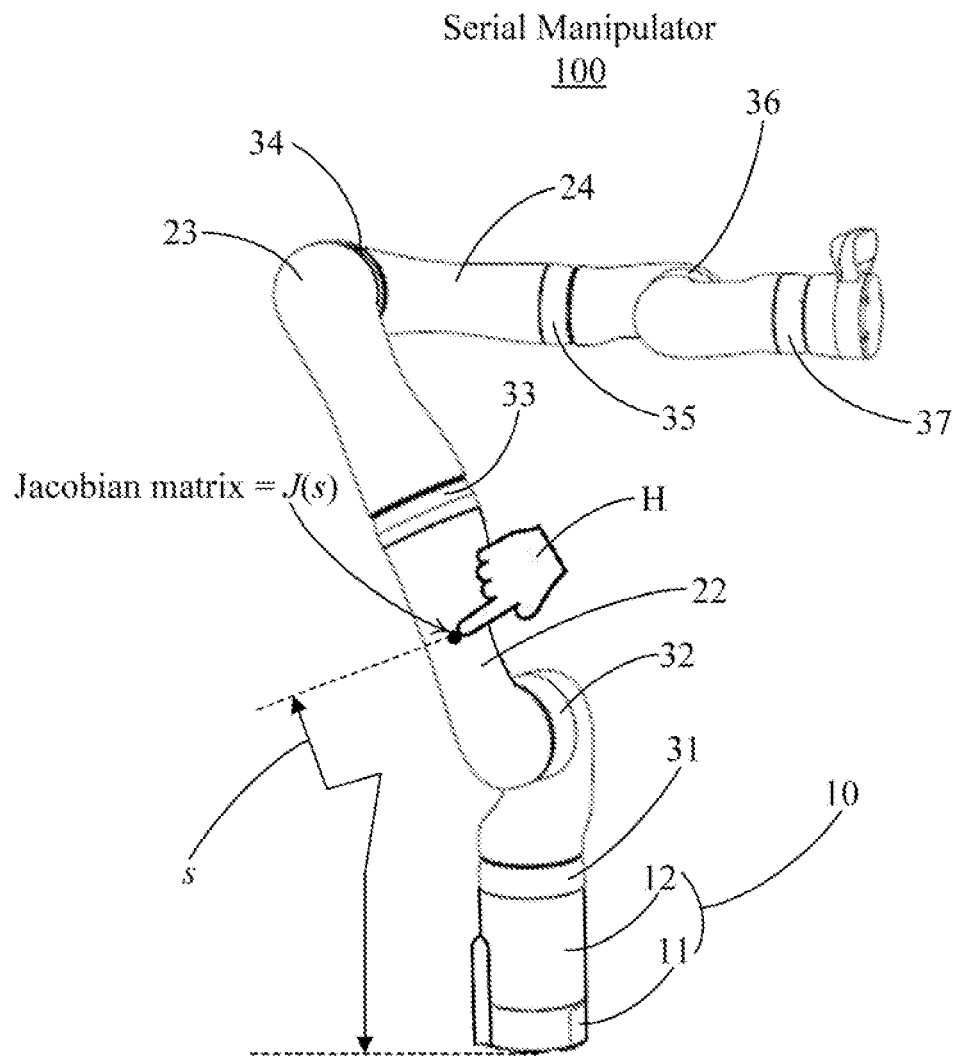
FIG. 6 is a schematic diagram of calculating the Jacobian matrix of the serial manipulator of FIG. 2.

Although the Jacobian matrix $J_n$ can be constructed using the joint angles of the current configuration of the serial manipulator 100 that is obtained from the above-mentioned encoder, depending on the location of the touch point, the size of the Jacobian matrix $J_n$ changes and the system can become unique, overdetermined, or undetermined. As a result, the Jacobian matrix $J_n$ may be calculated based on an arbitrary point (i.e., any point that may be chosen in any method) on the serial manipulator 100. FIG. 6 is a schematic diagram of calculating the Jacobian matrix $J_n$ of the serial manipulator 100 of FIG. 2. According to the manipulator kinematics, the Jacobian matrix $J_n$ may be calculated through a function J(s), where J( ) is a function related to the joint angle $\theta_i$, and s is a distance (i.e., one-dimensional length) of the arbitrary point on the serial manipulator 100 to the base 10. It should be noted that, the base link (i.e., the base 10) and the first link of the serial manipulator 100 are disregarded since they have zero Jacobian matrix $J_n$, which is acceptable as the touch on the base link and the first link is insignificant.

When s=0, the touch point is at the base 10. When s=1.1873 (the total length of the serial manipulator 100 in meter), the touch point is at the above-mentioned end effector. For instance, if an object such as a hand H touches the link 22 between the joint 32 and the joint 33, that is, the upper arm top half 22, at the touch point which has the distance s (e.g., 0.2 m) to the base 10 of the serial manipulator 100, the Jacobian matrix $J_n$ of the segment related to the touch point on the upper arm top half 22 will be calculated using the function J(s). An iterative approach may be used to search for the segment related to the touch point out of all the segments.

In the touch sensing method, the processing unit 110 may further estimate a plurality of joint torques $T_n$ of the serial manipulator 100 based on the obtained torque value $M_i$ of each of the joints 30 and the calculated Jacobian matrices $J_n$ (block 440 of FIG. 4). It may only consider the joint torques $T_n$ of the joints 30 related to the touch point for the estimation. For example, if the touch point is on the fifth link (i.e., the link 25), the joint torque $T_n$ of joints 31-35 will be considered. In some embodiments, if the serial manipulator 100 is discretized into the above-mentioned segments, as the location of each segment of the serial manipulator 100 is different, there will be a unique system with a different Jacobian for the segment. Correspondingly, the joint torque $T_n$ of the segment related to the touch point may be estimated based on the torque value $M_i$ of the joint 30 corresponding to the segment and the Jacobian matrix $J_n$ corresponding to the segment.

In the touch sensing method, the processing unit 110 may further calculate an error $E_k$ between the obtained torque value $M_i$ of the joints 30 and the estimated joint torque $T_n$ of the serial manipulator 100 that corresponds to the joints 30 (block 450 of FIG. 4). In which, the error $E_k$ is the error between the torque of the i-th joint 30 (i.e., the torque value $M_i$) related to the touch point that is obtained from the corresponding torque sensor S and the torque estimated based on the obtained torque of the i-th joint 30 (i.e., the joint torque $T_n$) and the Jacobian matrix $J_n$ corresponding to the i-th joint 30, and k is between 1 and the total number of the calculated errors $E_k$. In some embodiments, the error $E_k$ may be an L2-norm of the error between the obtained torque (i.e., the torque value $M_i$) and the estimated torque (i.e., the joint torque $T_n$) of the i-th joint 30.

The processing unit 110 may further determine one of the links 20 which is connected to the joint 30 with the minimum calculated error as having been touched (block 460 of FIG. 4). In some embodiments, if the error $E_k$ is the L2-norm of the error between the obtained torque and the estimated torque of the i-th joint 30, and the serial manipulator 100 is discretized into the above-mentioned segments, one of the links 20 which is connected to the joint 30 with the minimum calculated L2-norm of the error may be determined as having been touched.

Figure 7:
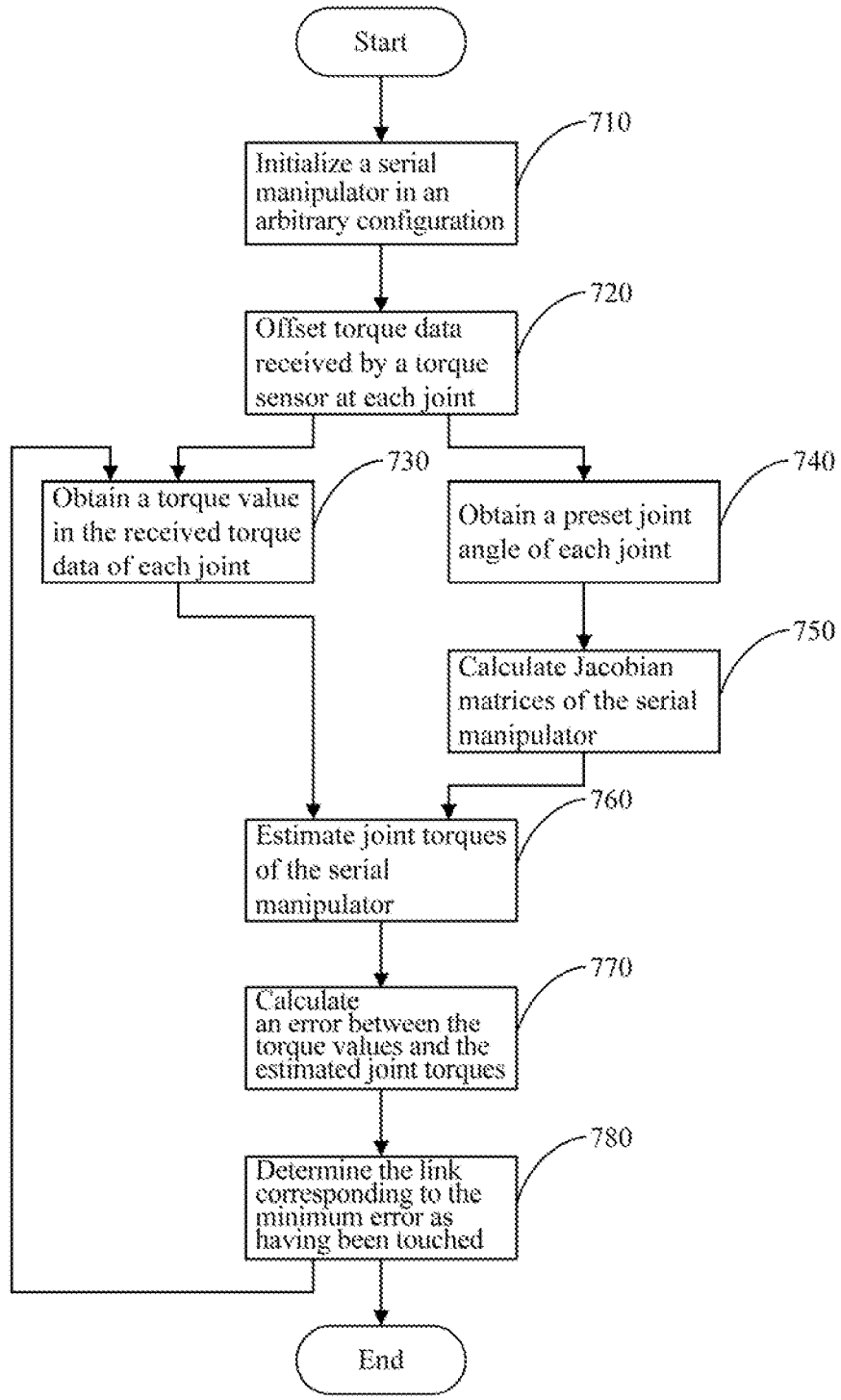
FIG. 7 is a flow chart of a touch sensing method according to some embodiments of the present disclosure.

FIG. 7 is a flow chart of a touch sensing method according to some embodiments of the present disclosure. In some embodiments, the touch sensing method may be implemented in the serial manipulator 100 to detect and localize external touches upon the serial manipulator 100. Accordingly, at step 710, the serial manipulator 100 is initialed in an arbitrary configuration (i.e., any configuration such as PPP configuration and RRR configuration). At step 720, torque data received by the torque sensor S at each of the joints 30 is offset through gravity compensation in which the gravity effect is ignored. At step 730, the torque value $M_i$ in the offset torque data (generated in response to an external touch) corresponding to each of the joints 30 is obtained (see also block 410 of FIG. 4). In some embodiments, the obtained torque value $M_i$ may be filtered using moving average (also referred to as rolling average or running average). At step 740, the preset joint angle $\theta_i$ of each of the joints 30 is obtained from the serial manipulator 100 (i.e., block 420 of FIG. 4). The joint angle $\theta_i$ may be the joint angle of the current configuration of the serial manipulator 100 that is obtained from the above-mentioned encoder of the serial manipulator 100. At step 750, the Jacobian matrices of the serial manipulator 100 are calculated based on the obtained joint angle $\theta_i$ of the joints 30 (i.e., block 430 of FIG. 4). In which, the torque data obtaining (i.e., step 730) may be performed simultaneously with the joint angle obtaining (i.e., step 740) and the Jacobian matrix calculation (i.e., step 750) by, for example, different threads that may be executed by different processors in the processing unit 110, or by other parallel processing mechanism.

Figure 8:
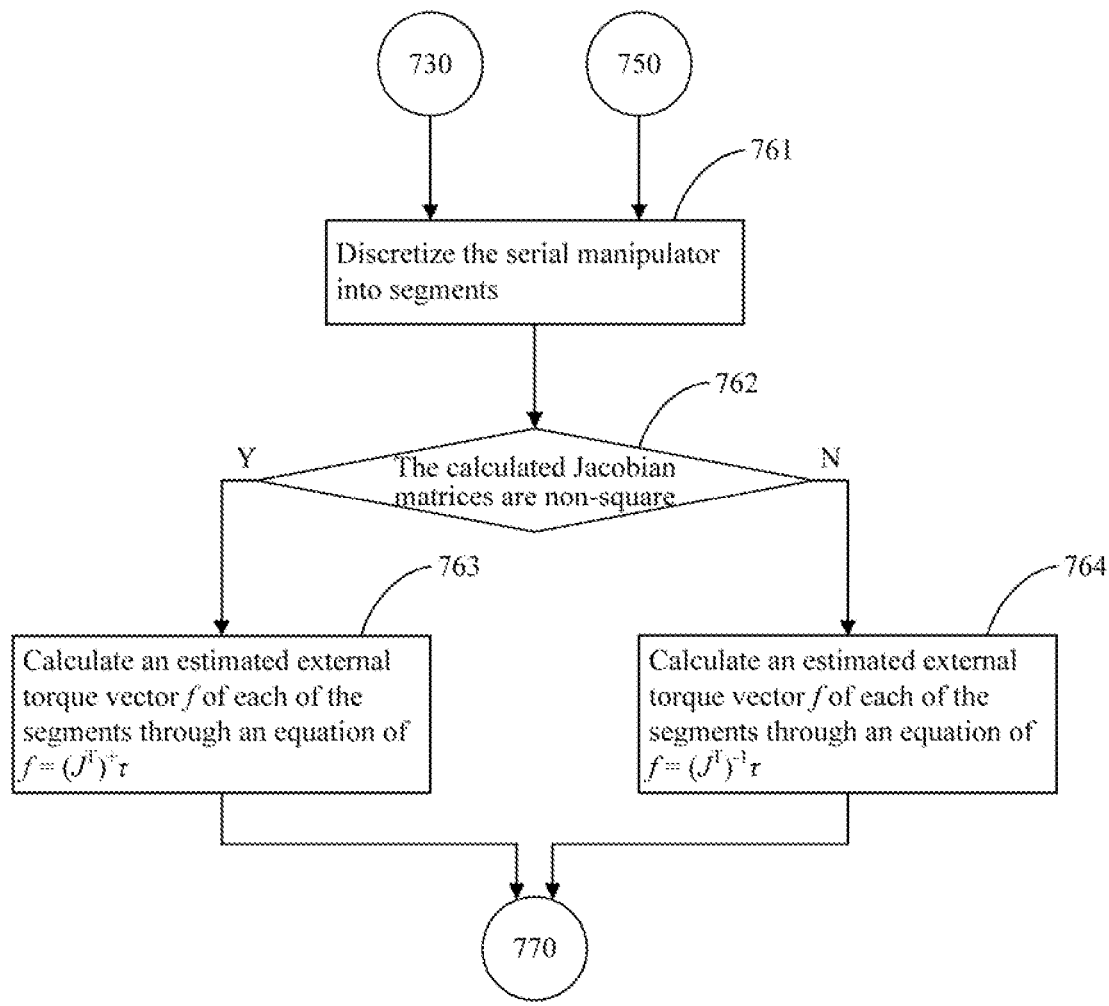
FIG. 8 is a flow chart of an example of estimating joint torques in the touch sensing method of FIG. 7.

At step 760, the joint torques $T_n$ of the serial manipulator 100 are estimated based on the obtained torque value $M_i$ of each of the joints 30 and the calculated Jacobian matrices $J_n$ (i.e., block 440 of FIG. 4). FIG. 8 is a flowchart of an example of estimating joint torques $T_n$ in the touch sensing method of FIG. 7. In some embodiments, for estimating the joint torques $T_n$, at step 761, the serial manipulator 100 is discretized into a plurality of segments. At step 762, a determination is made whether or not the calculated Jacobian matrices $J_n$ are non-square matrices (i.e., the serial manipulator 100 is redundant or not). If yes (i.e., the serial manipulator 100 is redundant), step 763 will be performed; otherwise (i.e., the serial manipulator 100 is non-redundant), step 764 will be performed.

The DH parameters of the serial manipulator 100 are used to construct a kinematic and dynamic model of the serial manipulator 100. The dynamics equation of the serial manipulator 100 may be defined as:

$$M\ddot{q}+C\dot{q}+G(q)+J^T f=\tau; \quad (1)$$

where, M is the mass matrix, q is the general coordinate vector, C is the Coriolis matrix, G is the gravitational force matrix, is the Jacobian matrix $J_n$, f is the external torque/force vector, and $\tau$ is the joint torque vector.

Since the serial manipulator 100 has been initialed in the arbitrary configuration (in step 710) and the gravity has been compensated (in step 720), the above-mentioned dynamics equation (i.e., equation (1)) of the serial manipulator 100 may be simplified (see equation (2) and equation (3) in below).

At step 763, an estimated external torque vector f of each of the segments which represents the joint torque $T_n$ will be calculated through an equation of:

$$f=(J^T)^+\tau; \quad (2)$$

where, J is the Jacobian matrix $J_n$ corresponding to the segment, + denotes the Moore-Penrose pseudoinverse, and $\tau$ is a joint torque vector including the torque value $M_i$ of the joint 30 corresponding to the segment. By taking the pseudoinverse, the least-squares solution of the estimated external torque vector f will be obtained. Assuming no external torques are applied, that is, no external touch is upon the serial manipulator 100, the estimated external torque vector f is reduced to a 3×1 vector.

At step 764, the estimated external torque vector f of each of the segments will be calculated through an equation of:

$$f=(J^T)^{-1}\tau; \quad (3)$$

where, J is the Jacobian matrix $J_n$ corresponding to the segment, and $\tau$ is a joint torque vector including the torque value $M_i$ of the joint 30 corresponding to the segment.

At step 770, the error $E_k$ between the obtained torque value $M_i$ of each of the joints 30 and the estimated joint torque $T_n$ of the serial manipulator 100 that corresponds to the joint 30 is calculated (i.e., block 450 of FIG. 4). At step 780, one of the links 20 which is connected to the joint 30 with the minimum calculated error $E_k$ is determined as having been touched (i.e., block 460 of FIG. 4). After step 780, step 730 may be performed to obtain the torque values $M_i$ of another external touch on the serial manipulator 100, and then the touched link of the new external touch can be determined.

Figure 9:
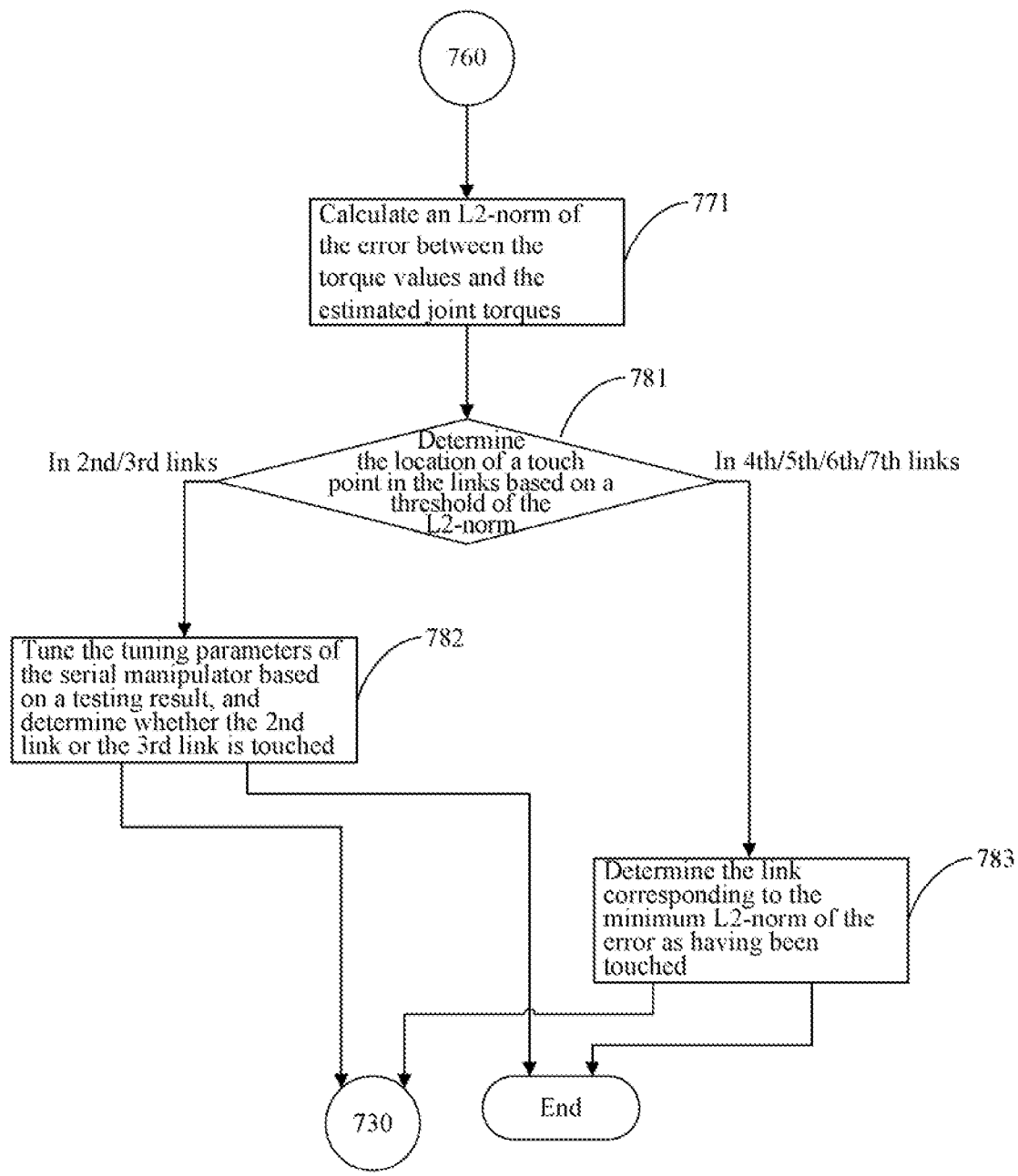
FIG. 9 is a flow chart of an example of determining the touched link of the serial manipulator of FIG. 2.

For a serial manipulator with seven degrees of freedom as the serial manipulator 100, from the investigation of the results of the L2-norm of the error $E_k$ between the actual torque value $M_i$ received from the torque sensors S and the estimated joint torque $T_n$, it is found that the L2-norm values are not useful for the second and the third links which may be due to the fact that the systems are underdetermined, and the L2-norm values are large for the second and the third links when the fourth link or above is touched. Therefore, tuning is need for the tuning parameters of the serial manipulator 100. For the second and the third links, the touched link may be estimated by using the torque value $M_i$ received from the torque sensors S because we can only consider the torque value $M_i$ received from the torque sensors S installed at the joint 32 and the joint 33. The tuning parameters may include the thresholds for the torque values $M_i$ of the joint 32 and the joint 33 and the threshold ratio between the torque values $M_i$ of the joint 32 and the joint 33. These can be tuned by increasing or decreasing the thresholds. FIG. 9 is a flow chart of an example of determining the touched link 20 of the serial manipulator 100 of FIG. 2. In some embodiments, for calculating the error $E_k$ the touched link 20 (in step 770), at step 771, the L2-norm of the error $E_k$ between the torque value $M_i$ of each of the joints 30 and the estimated joint torque $T_n$ of the segment corresponding to the joint 30 is calculated. Correspondingly, for determining the touched link 20 (in step 780), at step 781, whether a touch point is on the second and the third links in the seven links 20 (i.e., the links 22-23) or the fourth, the fifth, the sixth and the seventh links in the seven links 20 (i.e., the links 24-27) is determined based on a threshold of the L2-norm of the error $E_k$ between the torque value $M_i$ of each of the joints 20 and the estimated joint torque $T_n$ of the serial manipulator 100 that corresponds to the joint 30. According to the results of testing, the values of the L2-norm will be significantly larger when the fourth, the fifth, the sixth and the seventh links are touched than when the second and the third links are touched. At step 782, tuning parameter(s) of the serial manipulator 100 are tuned based on a testing result in response to the touch point being determined as being on the second and the third links in the seven links 20, and whether the second link or the third link is touched is determined based on the torque values $M_i$ obtained through the torque sensors S at the joints 31-33. The testing result may be obtained through a test using a force gauge to measure the external force applied orthogonally onto a specific link 20. The tuning parameter(s) of the serial manipulator 100 are tuned so that whether the second link or the third link is touched can be determined based on the torque values $M_i$ obtained through the torque sensors S at the joints 31-33. At step 783, one of the links 20 connected to the joint 30 with the minimum calculated L2-norm of the error $E_k$ is determining as having been touched.

The touch sensing method estimates the location of an external touch upon a serial manipulator by identifying the link where the external touch is located based on torque values detected through torque sensors and joint torques estimated through inverse dynamics and the kinematics. The method may be executed by a serial manipulator to locate the touch point on the serial manipulator, thereby realizing the interaction with the related objects, the correction of motions, or the collision avoidance. The method systematically takes most factors of kinematics and dynamics into consideration, while it does not require heavy computation and is fast and suitable for real-time application.

It can be understood by those skilled in the art that, all or part of the method in the above-mentioned embodiment(s) can be implemented by one or more computer programs to instruct related hardware. In addition, the one or more programs can be stored in a non-transitory computer readable storage medium. When the one or more programs are executed, all or part of the corresponding method in the above-mentioned embodiment(s) is performed. Any reference to a storage, a memory, a database or other medium may include non-transitory and/or transitory memory. Non-transitory memory may include read only memory (ROM), programmable ROM (PROM), electrically programmable ROM (EPROM), electrically erasable programmable ROM (EEPROM), flash memory, solid-state drive (SSD), or the like. Volatile memory may include random access memory (RAM), external cache memory, or the like.

The processing unit 110 (and the above-mentioned processor) may include central processing unit (CPU), or be other general purpose processor, digital signal processor (DSP), application specific integrated circuit (ASIC), field-programmable gate array (FPGA), or be other programmable logic device, discrete gate, transistor logic device, and discrete hardware component. The general purpose processor may be microprocessor, or the processor may also be any conventional processor. The storage unit 120 (and the above-mentioned memory) may include internal storage unit such as hard disk and internal memory. The storage unit 120 may also include external storage device such as plug-in hard disk, smart media card (SMC), secure digital (SD) card, and flash card.

The exemplificative units/modules and methods/steps described in the embodiments may be implemented through software, hardware, or a combination of software and hardware. Whether these functions are implemented through software or hardware depends on the specific application and design constraints of the technical schemes. The above-mentioned touch sensing method and serial manipulator may be implemented in other manners. For example, the division of units/modules is merely a logical functional division, and other division manner may be used in actual implementations, that is, multiple units/modules may be combined or be integrated into another system, or some of the features may be ignored or not performed. In addition, the above-mentioned mutual coupling/connection may be direct coupling/connection or communication connection, and may also be indirect coupling/connection or communication connection through some interfaces/devices, and may also be electrical, mechanical or in other forms.

The above-mentioned embodiments are merely intended for describing but not for limiting the technical schemes of the present disclosure. Although the present disclosure is described in detail with reference to the above-mentioned embodiments, the technical schemes in each of the above-mentioned embodiments may still be modified, or some of the technical features may be equivalently replaced, so that these modifications or replacements do not make the essence of the corresponding technical schemes depart from the spirit and scope of the technical schemes of each of the embodiments of the present disclosure, and should be included within the scope of the present disclosure.

What is claimed is:

1. A touch sensing method for a serial manipulator, wherein the serial manipulator has a plurality of links, a plurality of joints each connected to each of the links and jointly connect the links in series, and a plurality of torque sensors each installed at each of the joints; wherein the method comprises:

obtaining a torque value of each of the joints through the torque sensor at the joint;

obtaining a preset joint angle of each of the joints from the serial manipulator;

calculating a plurality of Jacobian matrices of the serial manipulator based on the obtained joint angle of the joints;

estimating a plurality of joint torques of the serial manipulator based on the obtained torque value of each of the joints and the calculated Jacobian matrices;

calculating an error between the obtained torque value of the joints and the estimated joint torque of the serial manipulator corresponding to the joints; and determining one of the plurality of links connected to the joint with the minimum calculated error as having been touched;

wherein the estimating the plurality of joint torques of the serial manipulator based on the obtained torque value of each of the joints and the calculated Jacobian matrices corresponding to the joint comprises:

discretizing the serial manipulator into a plurality of segments; and estimating the joint torque of each of the segments based on the torque value of the joint corresponding to the segment and the Jacobian matrix corresponding to the segment:

wherein the calculating the error between the obtained torque value of each of the joints and the estimated joint torque of the serial manipulator corresponding to the joint comprises:

calculating an L2-norm of the error between the torque value of each of the joints and the estimated joint torque of the segment corresponding to the joint; and the determining one of the plurality of links connected to the joint with the minimum calculated error as having been touched comprises:

determining one of the plurality of links connected to the joint with the minimum calculated L2-norm of the error as having been touched.

2. The method of claim 1, wherein if the calculated Jacobian matrices are non-square matrices, the estimating the joint torque of each of the segments based on the obtained torque value of the joint corresponding to the segment and the Jacobian matrix corresponding to the segment comprises:

calculating an estimated external torque vector f of each of the segments through an equation of:

$$f=(J^T)^+\tau;$$

where, J is the Jacobian matrix corresponding to the segment, + denotes the Moore-Penrose pseudoinverse, and $\tau$ is a joint torque vector including the torque value of the joint corresponding to the segment.

3. The method of claim 1, wherein if the calculated Jacobian matrices are square matrices, the estimating the joint torque of each of the segments based on the obtained torque value of the joint corresponding to the segment and the Jacobian matrix corresponding to the segment comprises:

calculating an estimated external torque vector f of each of the segments through an equation of:

$$f(J^T)^{-1}\tau;$$

where, J is the Jacobian matrix corresponding to the segment, and $\tau$ is a joint torque vector including the torque value of the joint corresponding to the segment.

4. The method of claim 1, wherein the plurality of links are seven links, and the serial manipulator further has a base connected to the first link in the seven links through one of the joints corresponding to the first link; the determining one of the plurality of links connected to the joint with the minimum calculated L2-norm of the error as having been touched comprises:

determining a touch point as being on whether the second and the third links in the seven links or the fourth, the fifth, the sixth and the seventh links in the seven links based on a threshold of the L2-norm of the error between the torque value of each of the joints and the estimated joint torque of the serial manipulator corresponding to the joint;

tuning parameters of the serial manipulator based on a testing result, and determining whether the second link or the third link is touched based on the torque values obtained through the torque sensors at the joints corresponding to the first link, the second link and the third link, in response to the touch point being determined as being on the second and the third links in the seven links; and determining one of the plurality of links connected to the joint with the minimum calculated L2-norm of the error as having been touched, in response to the touch point being determined as being on the fourth, the fifth, the sixth and the seventh links in the seven links.

5. The method of claim 1, wherein the serial manipulator further has a base connected to an end of the links through one of the joints, and the Jacobian matrix is calculated through a function J(s), where J( ) is a function related to the joint angle, and s is a distance of an arbitrary point on the serial manipulator to the base.

6. The method of claim 1, wherein the obtaining the torque value of each of the joints from the torque sensor at the joint comprises:

offsetting torque data received by the torque sensor at each of the joints through gravity compensation; and obtaining the torque value in the offset torque data corresponding to each of the joints.

7. The method of claim 6, wherein before the offsetting the torque data received by the torque sensor at each of the joints, the obtaining the torque value of each of the joints from the torque sensor at the joint further comprises:

initializing the serial manipulator in an arbitrary configuration.

8. A serial manipulator, comprising:

a plurality of links;

a plurality of joints each connected to each of the links and jointly connect the links in series;

a plurality of torque sensors each installed at each of the joints; and a controller comprising one or more processors and one or more memories storing one or more programs configured to be executed by the one or more processors, wherein the one or more programs include instructions to:

obtain a torque value of each of the joints through the torque sensor at the joint;

obtain a preset joint angle of each of the joints from the serial manipulator;

calculate a plurality of Jacobian matrices of the serial manipulator based on the obtained joint angle of the joints;

estimate a plurality of joint torques of the serial manipulator based on the obtained torque value of each of the joints and the calculated Jacobian matrices;

calculate an error between the obtained torque value of the joints and the estimated joint torque of the serial manipulator corresponding to the joints; and determine one of the plurality of links connected to the joint with the minimum calculated error as having been touched;

wherein the estimating the plurality of joint torques of the serial manipulator based on the obtained torque value of each of the joints and the calculated Jacobian matrices comprises:

discretizing the serial manipulator into a plurality of segments; and estimating the joint torque of each of the segments based on the torque value of the joint corresponding to the segment and the Jacobian matrix corresponding to the segment:

wherein the calculating the error between the obtained torque value of each of the joints and the estimated joint torque of the serial manipulator corresponding to the joint comprises:
  calculating an L2-norm of the error between the torque value of each of the joints and the estimated joint torque of the segment corresponding to the joint; and
the determining one of the plurality of links connected to the joint with the minimum calculated error as having been touched comprises:
  determining one of the plurality of links connected to the joint with the minimum calculated L2-norm of the error as having been touched.

9. The serial manipulator of claim 8, wherein if the calculated Jacobian matrices are non-square matrices, the estimating the joint torque of each of the segments based on the obtained torque value of the joint corresponding to the segment and the Jacobian matrix corresponding to the segment comprises:
  calculating an estimated external torque vector f of each of the segments through an equation of:

$$f=(J^T)^+\tau;$$

where, J is the Jacobian matrix corresponding to the segment, + denotes the Moore-Penrose pseudoinverse, and $\tau$ is a joint torque vector including the torque value of the joint corresponding to the segment.

10. The serial manipulator of claim 8, wherein if the calculated Jacobian matrices are square matrices, the estimating the joint torque of each of the segments based on the obtained torque value of the joint corresponding to the segment and the Jacobian matrix corresponding to the segment comprises:
  calculating an estimated external torque vector f of each of the segments through an equation of:

$$f=(J^T)^{-1}\tau;$$

where, J is the Jacobian matrix corresponding to the segment, and $\tau$ is a joint torque vector including the torque value of the joint corresponding to the segment.

11. The serial manipulator of claim 8, wherein the plurality of links are seven links, and the serial manipulator further has a base connected to the first link in the seven links through one of the joints corresponding to the first link; the determining one of the plurality of links connected to the joint with the minimum calculated L2-norm of the error as having been touched comprises:
  determining a touch point as being on whether the second and the third links in the seven links or the fourth, the fifth, the sixth and the seventh links in the seven links based on a threshold of the L2-norm of the error between the torque value of each of the joints and the estimated joint torque of the serial manipulator corresponding to the joint;
  tuning parameters of the serial manipulator based on a testing result, and determining whether the second link or the third link is touched based on the torque values obtained through the torque sensors at the joints corresponding to the first link, the second link and the third link, in response to the touch point being determined as being on the second and the third links in the seven links; and
  determining one of the plurality of links connected to the joint with the minimum calculated L2-norm of the error as having been touched, in response to the touch point being determined as being on the fourth, the fifth, the sixth and the seventh links in the seven links.

12. The serial manipulator of claim 8, wherein the serial manipulator further has a base connected to an end of the links through one of the joints, and the Jacobian matrix is calculated through a function J(s), where J( ) is a function related to the joint angle, and s is a distance of an arbitrary point on the serial manipulator to the base.

13. The serial manipulator of claim 8, wherein the obtaining the torque value of each of the joints from the torque sensor at the joint comprises:
  offsetting torque data received by the torque sensor at each of the joints through gravity compensation; and
  obtaining the torque value in the offset torque data corresponding to each of the joints.

14. The serial manipulator of claim 13, wherein before the offsetting the torque data received by the torque sensor at each of the joints, the obtaining the torque value of each of the joints from the torque sensor at the joint further comprises:
  initializing the serial manipulator in an arbitrary configuration.

15. A non-transitory computer readable storage medium storing one or more programs, wherein the one or more programs comprise instructions, which when executed by a serial manipulator having a plurality of links, a plurality of joints each connected to each of the links and jointly connect the links in series, and a plurality of torque sensors each installed at each of the joints, cause the serial manipulator to:
  obtain a torque value of each of the joints through the torque sensor at the joint;
  obtain a preset joint angle of each of the joints from the serial manipulator;
  calculate a plurality of Jacobian matrices of the serial manipulator based on the obtained joint angle of the joints;
  estimate a plurality of joint torques of the serial manipulator based on the obtained torque value of each of the joints and the calculated Jacobian matrices;
  calculate an error between the obtained torque value of the joints and the estimated joint torque of the serial manipulator corresponding to the joints; and
  determine one of the plurality of links connected to the joint with the minimum calculated error as having been touched;
wherein the estimating the plurality of joint torques of the serial manipulator based on the obtained torque value of each of the joints and the calculated Jacobian matrices comprises:
  discretizing the serial manipulator into a plurality of segments; and
  estimating the joint torque of each of the segments based on the torque value of the joint corresponding to the segment and the Jacobian matrix corresponding to the segment;
wherein if the calculated Jacobian matrices are non-square matrices, the estimating the joint torque of each of the segments based on the obtained torque value of the joint corresponding to the segment and the Jacobian matrix corresponding to the segment comprises:
  calculating an estimated external torque vector f of each of the segments through an equation of:

$$f=(J^T)^+\tau;$$

where, J is the Jacobian matrix corresponding to the segment, + denotes the Moore-Penrose pseudoinverse, and $\tau$ is a joint torque vector including the torque value of the joint corresponding to the segment.

16. The non-transitory computer readable storage medium of claim 15, wherein if the calculated Jacobian matrices are square matrices, the estimating the joint torque of each of the segments based on the obtained torque value of the joint corresponding to the segment and the Jacobian matrix corresponding to the segment comprises:

calculating an estimated external torque vector f of each of the segments through an equation of:

$$f=(J^T)^{-1}\tau;$$

where, J is the Jacobian matrix corresponding to the segment, and $\tau$ is a joint torque vector including the torque value of the joint corresponding to the segment.

17. The non-transitory computer readable storage medium of claim 15, wherein the calculating the error between the obtained torque value of each of the joints and the estimated joint torque of the serial manipulator corresponding to the joint comprises:

calculating an L2-norm of the error between the torque value of each of the joints and the estimated joint torque of the segment corresponding to the joint; and the determining one of the plurality of links connected to the joint with the minimum calculated error as having been touched comprises:

determining one of the plurality of links connected to the joint with the minimum calculated L2-norm of the error as having been touched.

18. The non-transitory computer readable storage medium of claim 17, wherein the plurality of links are seven links, and the serial manipulator further has a base connected to the first link in the seven links through one of the joints corresponding to the first link; and the determining one of the plurality of links connected to the joint with the minimum calculated U-norm of the error as having been touched comprises:

determining a touch point as being on whether the second and the third links in the seven links or the fourth, the fifth, the sixth and the seventh links in the seven links based on a threshold of the L2-norm of the error between the torque value of each of the joints and the estimated joint torque of the serial manipulator corresponding to the joint;

tuning parameters of the serial manipulator based on a testing result, and determining whether the second link or the third link is touched based on the torque values obtained through the torque sensors at the joints corresponding to the first link, the second link and the third link, in response to the touch point being determined as being on the second and the third links in the seven links; and determining one of the plurality of links connected to the joint with the minimum calculated L2-norm of the error as having been touched, in response to the touch point being determined as being on the fourth, the fifth, the sixth and the seventh links in the seven links.

19. The non-transitory computer readable storage medium of claim 15, wherein the serial manipulator further has a base connected to an end of the links through one of the joints, and the Jacobian matrix is calculated through a function J(s), where J( ) is a function related to the joint angle, and s is a distance of an arbitrary point on the serial manipulator to the base.

20. The non-transitory computer readable storage medium of claim 15, wherein the obtaining the torque value of each of the joints from the torque sensor at the joint comprises:

offsetting torque data received by the torque sensor at each of the joints through gravity compensation; and obtaining the torque value in the offset torque data corresponding to each of the joints.

\* \* \* \* \*